United States Patent Office 3,050,470
Patented Aug. 21, 1962

3,050,470
PROCESS OF REACTING A GROUP III-A METAL WITH A GROUP IV-A METAL HALIDE AND HYDROGEN IN A LIQUID ORGANIC MEDIUM AND THE PRODUCT OF SAID PROCESSES
Tillmon H. Pearson and Thomas O. Sistrunk, Baton Rouge, La., assignors to Ethyl Corporation, New York, N.Y., a corporation of Delaware
No Drawing. Filed Apr. 10, 1957, Ser. No. 651,798
4 Claims. (Cl. 252—429)

This invention is concerned with novel compositions of matter, particularly of complex metal compounds of the group III-A and group IV-A metals.

An object of this invention is to provide a novel composition of matter and a process for its manufacture. A specific object is to provide novel compositions which contain a group III-A metal and a group IV-A metal. A still further object is to provide a novel process for the manufacture of organolead compounds. An additional object is the provision of a novel process for the polymerization of olefins, especially ethylene. Other objects will be evident as the description proceeds.

According to this invention, novel compositions of matter are obtained by reacting a true group III-A metal with a group IV-A metal halide and hydrogen in the presence of an organic medium. The organic media preferably employed are the hydrocarbons, especially the aromatics, and the ethers, particularly the cyclic ethers. It has been found that the compositions so produced are particularly useful for subsequent reaction with an olefin, under one set of conditions, to produce products having metal to carbon bonds which can then be reacted with a lead salt to produce tetraorganolead compounds. Under another particular set of conditions, the products of this invention can be employed as catalysts for the polymerization of olefins. In an especially preferred embodiment, a composition of this invention is that obtained when reacting aluminum with titanium tetrachloride and hydrogen in the presence of benzene at a temperature between 90–120° C. and a pressure between 5,000–10,000 pounds per square inch gauge (p.s.i.g.).

The present invention provides novel compositions which are advantageously employed for the production of tetraorganolead compounds, especially tetraethyllead, in high yield and purity from inexpensive and readily available raw materials. In this connection the organolead compounds, especially tetraethyllead, are presently produced commercially by the reaction of a sodium-lead alloy and ethyl chloride. The process involves the utilization of sodium and chlorine values in addition to the realization of about only 22 percent of the lead being converted to organolead product. The compositions of this invention provide a new route which overcomes the aforementioned disadvantages. Additionally, the compositions produced are of particular utility as catalysts for the polymerization of olefins. In this connection, the polymer obtained, for example when polymerizing ethylene, is a solid polymer having a melting point of about 130° C. which is of greater utility than the present commercial ethylene polymer which has a melting point of about 98° C.

The metal which is employed in the reaction is a group III-A true metal, namely aluminum, gallium, indium, or thallium. The metal is generally employed in a finely divided form, e.g., as a powder, comminuted, or subdivided. On the other hand, gallium is generally liquid under the reaction conditions. The group IV-A metal halide can be a halide of the metals titanium, zirconium, hafnium or thorium. Typical examples of such metal halides include titanium tetrachloride, titanium trichloride, thorium tetrabromide, zirconium tetraiodide, zirconium triiodide, hafnium tetrafluoride and the like. Additionally mixed halo compounds can be employed as for example trichlorobromo titanium, difluorodiiodo zirconium, tribromoiodo thorium and the like. Aluminum and titanium tetrachloride are particularly preferred reactants in the process because of economy and since the product thereby produced is more reactive chemically.

As indicated previously, the reaction is conducted in the presence of an organic medium. The hydrocarbons and ethers are particularly well suited since they are reaction promoters. In general, any hydrocarbon or ether which is liquid under the reaction conditions can be employed. The media ordinarily employed do not contain more than about 20 carbon atoms. Included among the ethers to be employed are, for example, di-n-butyl ether, diethyl ether, di-sec-butyl ether, dibenzyl ether, methylphenyl ether, the dimethyl ether of ethylene glycol or diethylene glycol, ethylmethyl ether, resorcinol dimethyl ether, dimethyl ether, 1,2,4-trimethoxy benzene, furan, tetrahydrofuran dioxane dimethoxyethane and the like. The cyclic ethers, particularly tetrahydrofuran, are especially preferred since greater yields and reaction promotion are obtained in these particular ethers. Among the hydrocarbon diluents which can be employed are included for example the butanes, hexanes, decanes, octadecanes and their corresponding branched chain isomers, cyclopentane, cyclohexane, cycloheptane, methylcyclohexane and the like, and aromatic hydrocarbons as for example benzene, toluene, xylene, naphtalene, tetrahydronaphthalene, decahydronaphthalene and the like. The hydrocarbon media can be further substituted with organic substituents provided such substituents are essentially inert to the reactants and products. In general, it is preferred to employ hydrocarbons having nonreactive olefinic groups. The hydrocarbons need not however be pure hydrocarbons but can be mixtures thereof, for example, diesel oil, kerosene, gasoline and the like. The aromatic hydrocarbons are especially preferred among the hydrocarbon media since they have a greater reaction promoting effect as do the cyclic ethers. Therefore, in general terms, the process is preferably conducted in the presence of reaction promoting media.

The proportion of the reaction media employed is subject to considerable latitude as between about 0.01 to 100 parts of the media per part of the metal halide. For economy and efficient reaction between about 1 part to 25 parts of the medium is employed per part of the metal halide.

The process of this invention and the novel compositions thereby obtained will be more fully understood by reference to the following examples wherein all parts are by weight.

*Example 1*

To a high pressure rocking autoclave equipped with external heating means was added 35 parts of tetrahydrofuran, 4 parts of aluminum powder and 3.5 parts of titanium tetrachloride. The autoclave was pressurized to 9,000 p.s.i.g. with hydrogen gas and agitation commenced. The autoclave was externally heated to 114° C. and maintained under these operating conditions for 4.5 hours. The pressure drop during reaction was 800 p.s.i.g. The autoclave was then vented and the damp solids removed in an inert atmosphere. The solids were black in color. They were then hydrolyzed with water and the volume of gas measured. A total of 0.084 part of hydrogen was collected.

*Example II*

Example I was repeated essentially as described with the exception that 2.75 parts of titanium trichloride were reacted with 2 parts of powdered aluminum in 35 parts of tetrahydrofuran at 8,200 p.s.i.g. and 110° C. for 10 hours. The take-up of hydrogen was 300 p.s.i.g. The solids obtained were black which upon hydrolysis produced 0.12 part of hydrogen.

*Example III*

The procedure of Example I was duplicated as described with the exception that 2 parts of powdered aluminum were used and 35 parts of benzene were employed in place of the tetrahydrofuran. The product obtained was a black solid suspended in the benzene which was then filtered. The recovered solids were hydrolyzed and the hydrogen evolved was 0.145 part.

The temperature employed in the process of this invention is not critical toward obtaining the desired results and can be varied over a wide range. However, it has been found that excessively high temperatures are undesirable since the amount of hydrogen taken up by the metal and metal halide mixture is considerably reduced. In order to diminish this effect, the reaction is conducted between about room temperature, 25° C., and 150° C. For best yields in conjunction with enhancement of reaction rates it is preferred to employ a temperature between about 90 to 120° C.

The pressure which is employed can likewise be varied over a wide range of, in general, supra-atmospheric pressure as between atmospheric and 50,000 p.s.i.g. It is preferable to employ a pressure between about 5,000 to 10,000 p.s.i.g. At pressures below 5,000 p.s.i.g. the yield is lower. Pressures higher than 10,000 p.s.i.g. generally are not employed since the enhancement in yield is minor.

The proportion of the reactants can be varied over a wide range. In connection with the hydrogen, all that is necessary is to have a hydrogen or a hydrogen containing atmosphere in contact with the metal and metal halide under the conditions of operation described above. An excess of the group III–A metal or an excess of the group IV–A metal halide can be employed in the hydrogen atmosphere in order to obtain the desired result. However, for an enhanced yield, an excess of the metal over the amount that would be required to reduce the group IV–A metal halide to its lowest halide is generally employed. The amount of metal is based upon the reduction of the refractory metal halide merely as a matter of convenience since it is not clear than an actual reduction takes place. In a preferred embodiment between about the stoichiometric amount and 25 percent in excess thereof of the metal that would be required to reduce the refractory metal halide to its last lower valence state is employed to produce the best results.

The following examples will illustrate additional embodiments of this invention.

*Example IV*

Employing the procedure of Example I, 4 parts of aluminum are reacted with 3.5 parts of titanium tetrachloride in 30 parts of diethyl ether at a temperature of 30° C. and under a hydrogen pressure of 10,000 p.s.i.g. After reacting for 6 hours a black product is recovered which when hydrolyzed with water liberates hydrogen.

*Example V*

When 10 parts of gallium are reacted with 7 parts of zirconium tetrabromide while suspended in 35 parts of toluene at 150° C. and under a hydrogen pressure of 5,000 p.s.i.g. for 2 hours with vigorous agitation, a high yield of a product is obtained which when hydrolyzed with water liberates hydrogen.

*Example VI*

Employing the procedure of Example II, when 12 parts of indium powder are reacted with 10 parts thorium iodide while in suspension with 40 parts cyclohexane at 90° C. and under a hydrogen pressure of 25,000 p.s.i.g, a high conversion of a hydrogen containing product is obtained suspended in the cyclohexane.

Satisfactory results are obtained when thallium is substituted as the metal or other metal halides such as hafnium fluoride, titanium trichloro bromide and the like are employed in any of Examples I through VI. Similar results are also obtained when other organic media are used than those employed in the aforementioned examples as, for example, dioxane, dibenzyl ether, furan, amylethyl ether, dihydronaphthalene, mixed hexanes, tetralin, and the like. As indicated previously however, the cyclic ethers and aromatic hydrocarbons produce the highest yields in the reaction.

The reaction time can be varied as, for example, between 1 or 2 minutes and up to about 20 hours, depending upon the conditions of reaction employed and whether batch or continuous techniques are used. It is preferable to employ a reaction time between about 30 minutes and 10 hours in order to obtain the best yields under the varied conditions of reaction.

A particular use of the products of this invention is their subsequent olefination to produce organometallic compounds. Thus, in another embodiment of this invention the products are reacted with an olefin, preferably in the presence of an ether. Generally this operation is conducted at a temperature between about room temperature and 300° C. and supra-atmospheric pressure, e.g., 150 to 7,500 p.s.i.g. The ethers which have been mentioned hereinbefore are employed as diluents in this particular use since, for some unexplained reason, it has been found that different results are obtained when diluents other than ethers are employed. In some instances, the ether can be in admixture with a minor amount of another organic media, but such is not preferred. The olefins which are employed can be any olefin, however, the alpha olefins are particularly preferred because of their higher reactivity. Typical examples of olefins which can be employed are ethylene, propylene, alpha butylene, butadiene, styrene, and the like. The following example demonstrates this particular operation.

*Example VII*

Example II was repeated with the exception that the product while suspended in the tetrahydrofuran was reacted with ethylene at 94° C. for 6 hours at a pressure of 3,000 p.s.i.g. The takeup of ethylene was 340 p.s.i.g. No polymer was formed.

Similar results are obtained when the products produced in any of the Examples I through VI are reacted with ethylene or other olefins mentioned above in an ether at 30, 60, 120, 250, or 300° C. and pressures such as 300, 1,500, 4,500 or 6,000 p.s.i.g.

The product produced as described above and particularly in Example VII can then be reacted with a lead salt to produce an organolead compound, particularly tetraethyllead which is valuable as an antiknock material. In general, this step of the operation is conducted at a temperature between about room temperature and 250° C. with or without a diluent being present and with or without pressure being applied. It is preferred to employ a temperature between about 25 to 150° C. for producing the organolead compounds in order to avoid deleterious side effects and decomposition of the reactants and/or products. In general, any lead salt can be employed including both organic and inorganic salts comprising both divalent and tetravalent lead. Typical examples of the inorganic salts include the lead halides, especially the lead fluorides, the lead oxides, sulfides, sulfates, nitrates, thiocyanates, borates, phosphates and the like. Typical of the organic salts are those of organic compounds generally considered to be acids, for example, lead acetate, lead naphthenate, lead tallate, lead tetraacetate, lead phenolate, lead formate, and the like.

The following example will demonstrate this embodiment of the present invention.

*Example VIII*

The procedure of Example VII was duplicated with exception that the product was not recovered from the autoclave. The autoclave was vented, purged with nitrogen, and the solids diluted with 90 parts of tetrahydrofuran. Then 10 parts of lead acetate in finely divided form were added to the mixture. The autoclave was sealed and maintained at a temperature of 70° C. for 1 hour. At the end of this period the contents of the autoclave were cooled, and isopropanol added to destroy any remaining activity. The resulting mixture was filtered with washing of the solids with water. The organic layer of the filtrate was separated and vacuum distilled to recover 0.35 part of tetraethyllead.

In place of lead acetate in the above example, other lead salts can be employed to produce similar results, e.g., lead naphthanate, lead toluate, lead stearate, lead formate and the like. In this operation it is not necessary to employ an ether diluent. Hence if desired, the ether can be replaced with or supplemented by a hydrocarbon or an amine. When reacting certain inorganic lead salts as, for example, lead fluoride, lead nitrate, lead sulfate and others, a reaction promoting effect is obtained when employing ethers and amines.

Another particular utility of the products obtained according to any of the Examples I through VI is their use as catalysts in the polymerization of olefins. In this instance for some unexplained reason the catalysis is particularly pronounced when the product is suspended in a hydrocarbon, especially an aromatic hydrocarbon. For this reason it is generally preferred to employ the aromatic hydrocarbons as the suspension media for the catalysts. In this instance then, the novel compositions of this invention are reacted with an olefin, particularly the alpha olefins, at an elevated pressure and temperature. In general, the pressure is maintained between about 150 to 7,500 p.s.i.g. and the temperature between about 25 to 200° C. The amount of catalyst employed is not critical inasmuch as minor amounts are sufficient to produce the polymerization.

*Example IX*

To illustrate this embodiment of the present invention, Example III was repeated with exception that at the completion of the reaction the product was dried under vacuum at room temperature. The dried product was then dark grey and placed in an internally agitated autoclave suspended in 35 parts of benzene. The clave was then pressurized with ethylene to 2,000 p.s.i.g. Heating was commenced initiating an exothermic reacton whereby the temperature rose to 151° C. and pressure 5,600 p.s.i.g. followed by a rapid temperature and pressure drop to 100° C. and 2,400 p.s.i.g. within 30 minutes. The clave was then maintained at 104° C. for 4½ hours. The autoclave was completely filled with a white polymer of ethylene in solid form. This polymer was then boiled in methyl alcohol-HCl solution for 1.5 hours and dried in vacuum for 2 to 3 hours. The polymer had a melting point of 130° C.

Similar results are obtained when the products of Examples I through VI suspended in an aromatic hydrocarbon such as toluene, tetralin, xylene, ethylbenzene, and the like are employed as catalysts for polymerizing butadiene, styrene, butene-1 and the like olefins at temperatures of 25, 50, 150 and 200° C. and pressures of 10, 100, 400 and 500 atmospheres.

If desired, the ability of the products of this invention to catalyze the polymerization of olefins can be further enhanced by subjecting it to mechanical treatment. For this purpose, ball-milling is quite well suited. The catalyst can be prepared in a ball to accomplish the desired result and then reacted with the olefin. It is preferred, however, to remove the catalyst from the ball mill and conduct the polymerization in a separate reactor for easy recovery of the polymer.

While the above example demonstrates a preferred embodiment of the polymerization of olefins wherein the catalyst is preformed, alternatively it can be prepared in an in situ operation. Thus, the metal, metal halide, hydrogen, and ethylene can be charged simultaneously and subjected to the conditions of polymerization to obtain the polymer. In this instance the hydrogen reacts first and then catalyzes the polymerization.

The following example demonstrates this particular embodiment.

*Example X*

An autoclave similar to that employed in Example I was used. To this autoclave was added 300 cc. of dry hexane containing 5 percent benzene, 0.5 part of titanium tetrachloride and 20 parts of aluminum which was prepared by grinding an aluminum rod under hexane. The autoclave was then sealed and pressurized with 300 p.s.i.g. of ethylene and 300 p.s.i.g. of hydrogen. The autoclave was then heated to 98° C. and maintained at this temperature for 6 hours. Upon cooling, the reactor was then opened and no liquid was found. Instead, the reactor was filled with polymeric ethylene in solid form. The product was dried by allowing the hexane benzene mixture to evaporate and then treated with a 10 percent aqueous hydrochloric acid solution to remove metallic constituents contained therein. The product was then washed successively with water and dried at 90° C. This solid polymer had a melting point of 130° C.

A particular advantage of such catalysts is the feature that the polymerizations are conducted at lower pressures than heretofore required for polymerizing olefins, especially ethylene, while still obtaining a different type of polymer than the present commercial polyethylene.

It is evident that the process of this invention is capable of many varied embodiments. Accordingly, it is not intended that it be limited except as presented in the following claims.

We claim:

1. The product obtained by reacting a group III–A metal with a group IV–A metal halide and hydrogen in the presence of a liquid organic medium selected from the group consisting of hydrocarbons and ethers, at a temperature between about 25 and 150° C., and a pressure between atmospheric and 50,000 p.s.i.g., said group III–A metal being present in an amount of at least about the stoichiometric amount required to reduce said group IV–A metal halide to its last lower valence state.

2. The product obtained by reacting aluminum metal with titanium tetrachloride and hydrogen in the presence of benzene at a temperature between 25 and 150° C. and a pressure between about 5,000 to 10,000 p.s.i.g., said aluminum being present in amount between about the stoichiometric amount and 25% in excess thereof of the amount required to reduce said titanium tetrachloride to its last lower valence state.

3. The process which comprises reacting a group III–A metal with a group IV–A metal halide and hydrogen in the presence of a liquid organic medium selected from the group consisting of hydrocarbons and ethers, at a temperature between about 25 and 150° C., and a pressure between atmospheric and 50,000 p.s.i.g., said group III-A metal being present in an amount of at least about the stoichiometric amount required to reduce said group IV-A metal halide to its last lower valence state.

4. The process which comprises reacting aluminum with titanium tetrachloride and hydrogen in the presence of benzene at a temperature between 25 and 150° C. and a pressure between about 5,000 to 10,000 p.s.i.g., said aluminum being present in amount between about the stoichiometric amount and 25% in excess thereof of the amount required to reduce said titanium tetrachloride to its last lower valence state.

References Cited in the file of this patent

UNITED STATES PATENTS

| | | |
|---|---|---|
| 2,483,130 | Garrison | Sept. 27, 1949 |
| 2,524,771 | Darling | Oct. 10, 1950 |
| 2,562,856 | Calingaert et al. | July 31, 1951 |
| 2,575,323 | Shapiro et al. | Nov. 20, 1951 |
| 2,666,756 | Boyd et al. | Jan. 19, 1954 |
| 2,773,053 | Field et al. | Dec. 4, 1956 |

FOREIGN PATENTS

| | | |
|---|---|---|
| 1,132,506 | France | Nov. 5, 1956 |